ENCODER

DECODER

INVENTOR
W. G. HALL
BY R. O. Nimz
ATTORNEY

INVENTOR
W. G. HALL
BY
[signature]
ATTORNEY

SELECTABLE CHARACTERISTIC COMPANDOR FOR PULSE CODE TRANSMISSION

Filed Nov. 24, 1961

FIG. 4 DECODER

INVENTOR
W. G. HALL
BY
L. O. Wirtz
ATTORNEY

INVENTOR
W. G. HALL
BY R. O. Nimtz
ATTORNEY

INVENTOR
W. G. HALL
BY R. O. Nimtz
ATTORNEY

April 27, 1965 W. G. HALL 3,180,939

SELECTABLE CHARACTERISTIC COMPANDOR FOR PULSE CODE TRANSMISSION

Filed Nov. 24, 1961 6 Sheets-Sheet 6

INVENTOR
W. G. HALL
BY
ATTORNEY

United States Patent Office 3,180,939
Patented Apr. 27, 1965

3,180,939

SELECTABLE CHARACTERISTIC COMPANDOR FOR PULSE CODE TRANSMISSION

William G. Hall, Morris Township, Morris County, N.J., assignor to Bell Telephone Laboratories, Incorporated, New York, N.Y., a corporation of New York Filed Nov. 24, 1961, Ser. No. 154,452
12 Claims. (Cl. 179—15)

This invention relates to pulse code modulation communication systems and, more particularly, to variable amplitude range compression and expansion encoders and decoders for use in such systems.

It has long been known to compress the amplitude range of signals prior to transmission and to expand this amplitude range back to its original breadth after reception. In analog transmission systems, the advantage of compression and expansion is the increased signal to transmission line noise ratios made possible by restricting the transmitted signal to a limited amplitude range. In a pulse code modulation (PCM) system, however, where the transmitted signals are pulses of uniform amplitude, these signals are almost completely impervious to transmission line noise since only a presence or absence decision is required. PCM systems suffer degradation from a different source than noise on the transmission line, that is, from the granularity introduced by quantizing signals before encoding. Again, however, compressing and expanding the amplitude range serves a useful purpose. "Companding" (compressing and expanding) in pulse code systems reduces the quantizing error for small amplitude signals, where granularity is very noticeable, at the expense of increasing granularity for high amplitude signals where it is scarcely noticeable. One companding pulse code modulation system is disclosed in United States Patent 2,889,409, issued June 2, 1959, to R. L. Carbrey.

It has been known that the companding advantage (quantizing error reduction) obtained in quantized PCM systems is directly related to the root-mean-square input voltage. It has been common practice to choose the maximum amplitude to be encoded so as to accommodate the highest amplitude input signals to be expected (loudest talkers in a speech system) and to choose a companding characteristic which provides the best compromise on quantizing error. This results in optimum companding advantage for only a limited range of input signal values and, in some cases, can actually result in degradation of signals near the upper and lower limits of this amplitude range. Speech signals, for example, have a disparity of as much as 50 decibels between the loudest and the weakest talker. It is difficult, if not impossible, to choose a single companding characteristic which advantageously accommodates all talkers in this wide spectrum. This and other problems are discussed in an article by B. Smith entitled "Instantaneous Companding of Quantized Signals," appearing in volume 36 of the Bell System Technical Journal, May 1957, pages 653 through 709.

It is an object of the present invention to minimize the quantizing error in a companded pulse-code-modulation system over the entire range of input signal levels.

It is a more specific object of the invention to present to each input signal to a companded pulse-code-modulation system a substantially optimum companding characteristic for that input signal level.

It is a further object of the invention to variably compress and expand the amplitude range of quantized signals.

In accordance with the present invention, pulse code modulation encoders and decoders are provided having variable companding characteristics. More particularly, a sequential recognition type of encoder is provided in which a series of comparisons between a signal sample and a successively generated set of reference signals is utilized to derive the digits of a permutation code group, beginning with the most significant digit. These reference signals are generated in a switched resistor network which resistors have values related in a binary sequence to each other, but arranged to generate reference signals bearing a nonlinear relationship to the pulse code groups being used. Moreover, the resistor network includes a plurality of alternative subnetworks, each providing reference signals having a different nonlinear relationship to the pulse code groups being used.

A signal detector recognizes the root-mean-square level of the input voltage and selects an appropriate subnetwork to provide the desired compression characteristic. Moreover, the identification of this compression characteristic is encoded and transmitted along with the sample codes to the remote decoder where it is used to provide the complementary expansion characteristic.

It can be seen that, in accordance with the present invention, companding characteristics can be selected to provide a minimum quantizing error for any particular input signal level. This can be accomplished, not only by choosing the shape of the companding curves, but also by selecting the maximum amplitude to be encoded, and hence increasing the number of quantizing steps in the transmitted amplitude range. Furthermore, the same selection circuitry serves to set a lower threshold below which the input is assumed to be only background noise and no encoding or transmitting takes place. This eliminates noise due to encoder instability at amplitude levels near zero and sharpens the contrast of low level signal components.

A feature of the present invention resides in the use of means for transmitting the long term signal level as a permutation code group wherein each digit is transmitted separately, affixed to a different instantaneous sample code group. Since the root-mean-square voltage detector is arranged to integrate over periods of at least syllabic duration, this slow transmission of level codes is more than adequate.

These and other features and objects, the nature of the present invention and its various advantages, will be more readily understood upon consideration of the attached drawings and of the following detailed description of the drawings.

Figure 1:
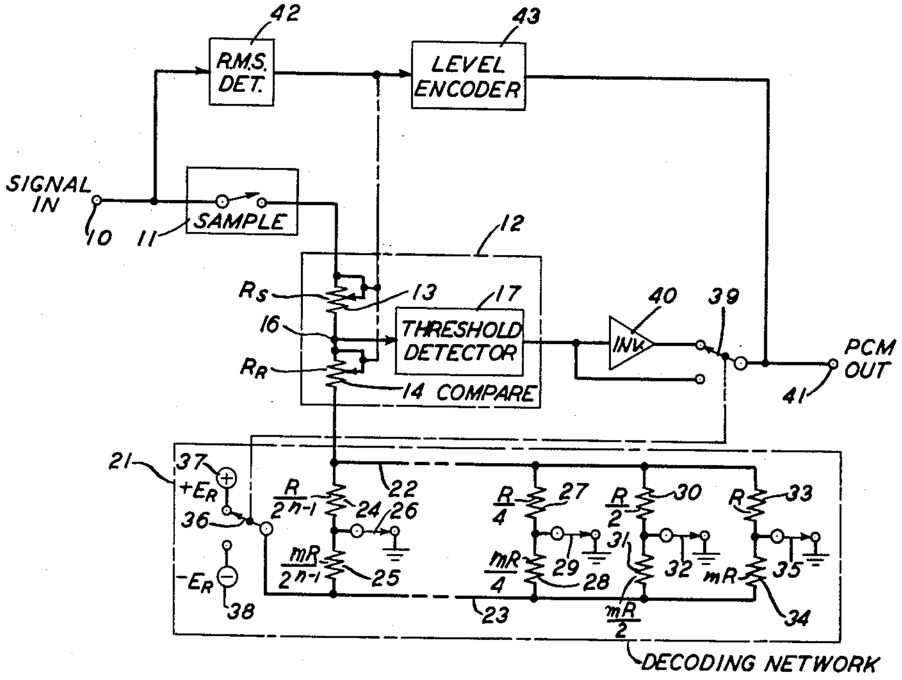
FIG. 1 is a simplified schematic block diagram of a variable companding encoder in accordance with the present invention.

Referring more particularly to FIG. 1, there is shown a simplified schematic diagram of a pulse-code-modulation encoder utilizing variable amplitude compression in accordance with the present invention. Analog signals are applied to input terminal 10 of the encoder of FIG. 1. A signal sampling circuit 11, illustrated schematically as a switch, derives amplitude-modulated pulses from the signal applied to terminal 10. Sampling circuit 11 is advantageously arranged to derive samples of the input signal at a rate at least equal to twice the highest frequency component present in the input signal. As is well known, such a sampling rate permits reconstruction of the analog signal with no loss of information content. In a speech system, for example, a sampling rate of eight kilocycles permits the accurate reconstruction of a speech signal having a four kilocycle bandwidth.

Amplitude-modulated pulses derived by sampling circuit 11 are applied to one input of compare circuit 12. Compare circuit 12 comprises a resistor summing network including a variable signal input resistor 13 and a variable reference resistor 14. This summing network provides at common point 16 a current which is equal to the algebraic sum of the currents through resistors 13 and 14. This current is delivered to a threshold detector 17 which produces an output pulse if, and only if, the input current is positive.

Connected to reference resistor 14 is a passive decoding network 21. Network 21 comprises a plurality of switched resistor branches connected in parallel between output bus 22 and reference voltage bus 23. Each branch comprises a pair of resistors connected in series and having a switch arranged to selectively connect their midpoint to ground potential. Thus resistors 24 and 25 are connected in series between buses 22 and 23 and a switch 26 connects their midpoint to ground potential; resistors 27 and 28 have a switch 29 connecting their midpoint to ground; resistors 30 and 31 have a switch 32 connecting their midpoint to ground; and resistors 33 and 34 have a switch 35 connecting their midpoint to ground. Bus 23 is connected to a transfer switch 36 which selectively connects bus 23 to a positive reference voltage source 37 or a negative reference voltage source 38.

Upper resistors 24, 27, 30 and 33 have values increasing in a binary progression with respect to each other. Thus resistor 24 has a value of $R/2^{n-1}$, resistor 27 a value of R/4, resistor 30 has a value of R/2, and resistor 33 has a value of R, where $n$ is the total number of resistive branches connected between buses 22 and 23.

Lower resistors 25, 28, 31 and 34 also have values increasing in a binary progression, but have values each bearing a fixed ratio $m$ to the value of the upper resistor in the same branch. Thus resistor 25 has a value of $mR/2^{n-1}$, resistor 28 has a value of $m$R/4, resistor 31 has a value of $m$R/2, and resistor 34 has a value of $m$R.

Decoding network 21 will be recognized as a well-known passive binary decoding network producing a nonlinear relationship between input codes and output voltages. A binary code is entered in the decoding network 21 by the permutations of the settings of switches 36, 26, 29, 32 and 35. The positions of these switches which are illustrated in FIG. 1 (switch 36 connecting sub 23 to positive voltage source 38 and switches 26, 29, 32 and 35 closed) correspond to binary "0's" in each digit position and can be considered the "home" positions of these switches. Transferring switch 36 to negative source 38 or opening any of switches 26, 29, 32 or 35 corresponds to entering a binary "1" in the respective digit position. Such decoding networks are discussed in detail in an article by B. D. Smith entitled "Coding by Feedback Methods" appearing in volume 41 of the Proceedings of the Institute of Radio Engineers, pages 1053 through 1058, August 1953.

The general operation of the encoder of FIG. 1 is as follows. For each sample derived by sampling circuit 11, decoding network 21 is adjusted until the error signal represented by the algebraic sum of the signal sample amplitude and the decoded amplitude, is minimized. The first digit, represented by the position of switch 36, indicates the sign of the signal sample. The remaining digits, represented by the positions of switches 26, 29, 32 and 35, indicate in binary notation the magnitude of the signal sample. In order to successively generate the digits of the binary code, the signal sample is successively tested against the reference values produced by network 21 as the switches are successively operated out of their home positions.

In order to implement the above technique, point 16 is connected to threshold detector 17 which produces a pulse whenever the current sum at point 16 exceeds zero. The output of detector 17 is applied directly to one transfer contact of a switch 39 and, through an inverter circuit 40, to the other transfer contact of switch 39. Switch 39 therefore selectively connects output terminal 41 directly to the output of detector 17 or to the inverted output of detector 17. Switches 36 and 39 are interlocked so that they operate together.

As discussed in the above-noted Smith article in the Procedings of the Institute of Radio Engineers, the total resistance of network 21 looking back from bus 22 with bus 23 shorted to ground is given by $$R_T=\frac{(m+1)}{(m+1)(2^n-1)-mk}R \qquad (1)$$

and the current supplied in parallel with the total resistance, i.e., the Norton equivalent current, is $$I_T=\pm\frac{E_R}{R}\left(\frac{k}{m+1}\right) \qquad (2)$$

where the plus or minus is determined by the setting of switch 36, $k$ is the analog equivalent of the binary number represented by the positions of switches 26, 29, 32 and 35, and $n$ is the number of digits, excluding the polarity digit.

Combining Equations 1 and 2 to obtain the current $I_R$ through resistor 14 gives $$I_R=\pm E_R\frac{k}{(m+1)[R+(2^n-1)R_R]-mkR_R} \qquad (3)$$

where $R_R$ is the value of the resistor 14.

It can be seen that Equation 3 defines segments of two hyperbolas, one in the first quadrant and one in the third quadrant, each relating the output current $I_R$ and the binary number $k$. When $k$ is zero (all switches closed), $I_R$ is also zero since bus 23 is completely shunted down by switches 26, 29, 32 and 35. The maximum value of $k$ is $(2^n-1)$ (all switches open) and $I_R$ is then equal to $$I_{R_{max}}=\pm\frac{E_R}{R_R+R\left\{\frac{m+1}{2^n-1}\right\}} \qquad (4)$$

It can be seen that varying the values of $m$ or $R_R$ will vary the curvature of the hyperbolic compression curves.

Switch 39 transfers the decision of detector 17 to output terminal 41 as the digits of a binary code group. When the circuit is operating in the first quadrant (switches 36 and 39 operated down), an output from detector 17 indicates that the signal sample is greater than the reference signal. In the third quadrant this decision is inverted by inverter 40 to indicate that the signal sample is less than the reference signals. As a result, the appearance of a pulse at output terminal 41 indicates at all times that the absolute magnitude of the signal sample is greater than the absolute magnitude of the reference signal.

The encoding of signal samples by the circuit of FIG. 1 proceeds in the following manner. When a sample is derived by sampling circuit 11, a current $I_s$ is delivered to point 16, where $I_s=E_s/R_s$, $E_s$ being the magnitude of the signal sample voltage and $R_s$ being the value of resistor 13. With switches 26, 29, 32 and 35 in the positions shown, $I_R$ is equal to zero. The total current $I_t$ at point 16 is therefore equal to the input current $I_s$.

Switches 36 and 39 are first operated to their lower contacts as the first test condition. If the input signal is positive, $I_s$ will be positive and threshold detector 17 will produce a pulse which will be transferred to output terminal 41. This pulse is the first digit of the binary code group and represents the positive polarity of the input signal. It also causes switches 36 and 40 to remain operated to their lower contacts.

If the input signal is negative, $I_s$ will be negative and threshold detector 17 will not produce a pulse. No pulse will appear at output terminal 41, indicating the negative polarity of the input signal. In response to this condition, switch 36 is released to return bus 23 to positive reference source 37 for the generation of the remaining digits. The output produced from inverter 40 can be used for this purpose. Switch 39, of course, will also be returned to the position shown for the generation of the succeeding digits.

Assuming that the input signal is positive and that switches 36 and 39 remain in their lower positions, the next step is to open switch 26 and disconnect the midpoint of resistors 24 and 25 from ground potential. This causes a negative reference current to flow through resistor 14 in the amount indicated by Equation 3, switch 26 representing the most significant digit in the binary number and hence resulting in a value of $k$ equal to $(2^{n-2})$. This reference current is subtracted from the input signal current. Again, if the current produced by the input signal exceeds the reference current, a pulse is produced by detector 17 and delivered to output terminal 41. Switch 26 then remains in the open position. If the input current $I_s$ is less than this reference current, no output pulse is produced by detector 17 and switch 26 is returned to the position shown, possibly by the output of inverter 40.

In this manner, considering the magnitudes only, the input signal is successively tested against a reference signal increasing in magnitude in binary steps, the largest steps occurring first. Whenever the reference exceeds the input signal, the stepped increase causing this condition is reversed and the comparison continued with succeedingly smaller steps. In this way, the signal sample is encoded in successive steps, beginning with the polarity, then the most significant digit, and proceeding in sequence to the last significant digit. When this process is complete, the switches 36, 26, 29, 32 and 35 are all reset to the home positions illustrated and a new sample is derived by circuit 11. Encoding of the new sample may then proceed as before.

If the input sample is of negative polarity, exactly the same process occurs except that the reference signals are positive. Under this situation, switch 39 remains in the "up" or home position and an output pulse is delivered to terminal 41 each time the sum of the input and reference signals is less than zero. Whenever the current delivered to detector 17 changes sign, an output pulse is not produced and a switch is returned to the home position illustrated.

In accordance with the present invention, the values of resistors 13 and 14 are made adjustable. The value of resistor 14 ($R_R$) determines the curvature of the compression curve. Varying $R_R$, and hence this curvature, amounts to taking a different hyperbola for the encoding process and hence provides a different compression characteristic. Varying the value of $R_s$ adjusts the point at which the hyperbola intersects the maximum code level and adjusts every other code level in proportion. Variation in the curvature of the compression hyperbola by what may be termed the curvature control resistor 14 ($R_R$) provides an optimum signal to quantizing noise ratio for each power level of input signals.

Variation of the terminal points of the hyperbola by what may be termed the range control resistor 13 ($R_s$) allows the encoding range to be fitted to the expected range of input signals having the particular power level. It should be understood, however, that resistors 13 and 14 are not independent adjustments, and their variations must be coordinated to produce the most advantageous characteristics.

A root-mean-square signal detector 42 is connected to input terminal 10. Detector 42 derives at its output a signal which is proportional to the root-mean-square input voltage (power level) integrated over at least a syllabic interval. The output of detector 42, which is a measure of the mean power of the input signal (the loudness of a speech input), is used to control the value of resistors 13 and 14. As noted above, resistor 14 controls the shape of the compression characteristic, and hence the signal to quantizing noise ratio for that particular input. Since weaker signals do not heed the large encoding range required by stronger signals, significant improvements can also be made by accommodating the encoding range to the range of instantaneous amplitudes to be expected. Variation of resistor 13 adjusts the range of signals encoded. That is, for weak signals, codes are not provided in the amplitude range wherein the signal seldom, if ever, falls. For stronger signals, on the other hand, unique codes are provided for those large amplitude ranges into which the signal may reasonably be expected to fall a reasonable number of times. The specific improvements in signal-to-quantizing noise ratios is quantitatively expressed in the above-noted Smith article in the Bell System Technical Journal.

The output of detector 42 is therefore used to control the value of resistors 13 and 14 such that the encoding range and shape is optimally related to the root-means-square input signal. The root-mean-square (R.M.S.) output signal from detector 42 is also applied to level encoder 43 which encodes this R.M.S. quantity in a suitable binary code and applies it to output terminal 41. The digits of this level code are interleaved with the sample code groups in such a fashion that they can be separated out at the receiving terminal and utilized to provide the decoder with an expansion characteristic complementing the compression characteristic of the encoder. The details of the encoding and interleaving arrangements will be discussed in detail hereafter.

It can be seen that the encoder illustrated in FIG. 1 is suitable for providing a variable compression characteristic for signals applied to input terminal 10. The compression characteristic, moreover, is selected to provide an optimum signal-to-quantizing noise ratio for the particular range of input signals applied to the encoder at that time. This compression characteristic can be and is altered to accommodate in an optimum fashion any input signal range applied to the encoder.

Figure 2:
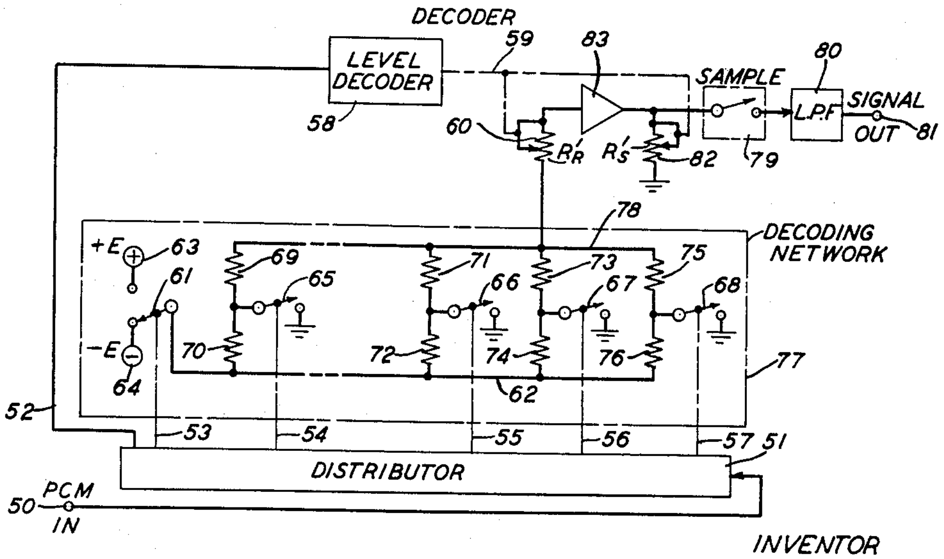
FIG. 2 is a simplified schematic block diagram of a variable compounding decoder in accordance with the present invention.

Referring more particularly to FIG. 2, there is shown a schematic diagram of a variable expansion decoder in accordance with the present invention and suitable for decoding signals generated in the encoder of FIG. 1. The decoder of FIG. 2 comprises an input terminal 50 to which there are applied pulse-code-modulated signals including a first digit, representing the polarity of the analog signal represented thereby, a plurality of other digits representing the magnitude of the analog signal, and at least one further digit comprising a portion of a code representing the root-mean-square level of the analog input signal over intervals of at least syllabic length. The latter signals are, of course, those generated in level encoder 43 in FIG. 1.

The pulse code groups arriving at terminal 50 are applied to a distributor circuit 51 which may comprise a simple tapped delay line. Distributor 51 serves to distribute the pulses of each code group to output leads 52 through 57. Pulses appearing on lead 52 are applied to a level decoding network 58 which utilizes the code groups formed by successive signals on lead 52 to generate a control signal on lead 59 which controls the magnitude of reference resistors 60 and 82.

The output signal on lead 53 controls a double throw switch 61 which selectively connects a reference bus 62 to a positive reference voltage source 63 or a negative reference voltage source 64. The signal on lead 53, of course, represents the polarity of the analog signal to be generated by the decoder of FIG. 2. Signals on leads 54 through 57 serve, respectively, to selectively connect the midpoints of each associated series resistance circuit to ground potential. Thus, switch 65 connects the midpoint of resistors 69 and 70 to ground potential; switch 66 connects the midpoint of resistors 71 and 72 to ground potential; switch 67 connects the midpoint of resistors 73 and 74 to ground potential; and switch 68 connects the midpoint of resistors 75 and 76 to ground potential. Resistors 69 through 76 form a passive decoding network 77, each pair being connected in series between reference bus 62 and output bus 78. The voltage on bus 78 is applied to one end of variable resistor 60, the other end of which is connected to a sampling circuit 79.

It will be noted that network 77 is identical to network 21 in FIG. 1. The application of a pulse group to network 77 produces the same permutation of switches 61, 65, 66, 67 and 68 as are present in the switches within network 21 of FIG. 1 after encoding the same analog signal. Under the control of level decoder 58, resistor 60 also assumes a value equal to the value of resistor 14 in FIG. 1 and resistor 82 assumes a value equal to the value of resistor 13 in FIG. 1 while encoding the same analog signal. Impedance converter 83 translates a low impedance at the upper terminal of resistor 60 into a high impedance at the upper terminal of resistor 82, while maintaining the current level constant. Hence, the signal delivered to sampling circuit 79 is equal to the quantized reference signal which most closely matches the analog input signal. The operation of sampling circuit 79 derives an amplitude-modulated pulse having this magnitude.

Successive pulse code groups applied to terminal 50 therefore produce a series of amplitude-modulated pulse samples at the output of sampling circuit 79. The magnitude of the amplitudes of these samples follows the amplitude of the analog signal. This series of amplitude-modulated pulse samples is delivered to a low pass filter circuit 80 having an upper cutoff frequency higher than the highest frequency component expected in the analog signal but lower than the pulse repetition rate of the amplitude-modulated pulse series. The output signal delivered to output terminal 81 therefore comprises a faithful reconstruction of the input analog signal.

Figure 3:
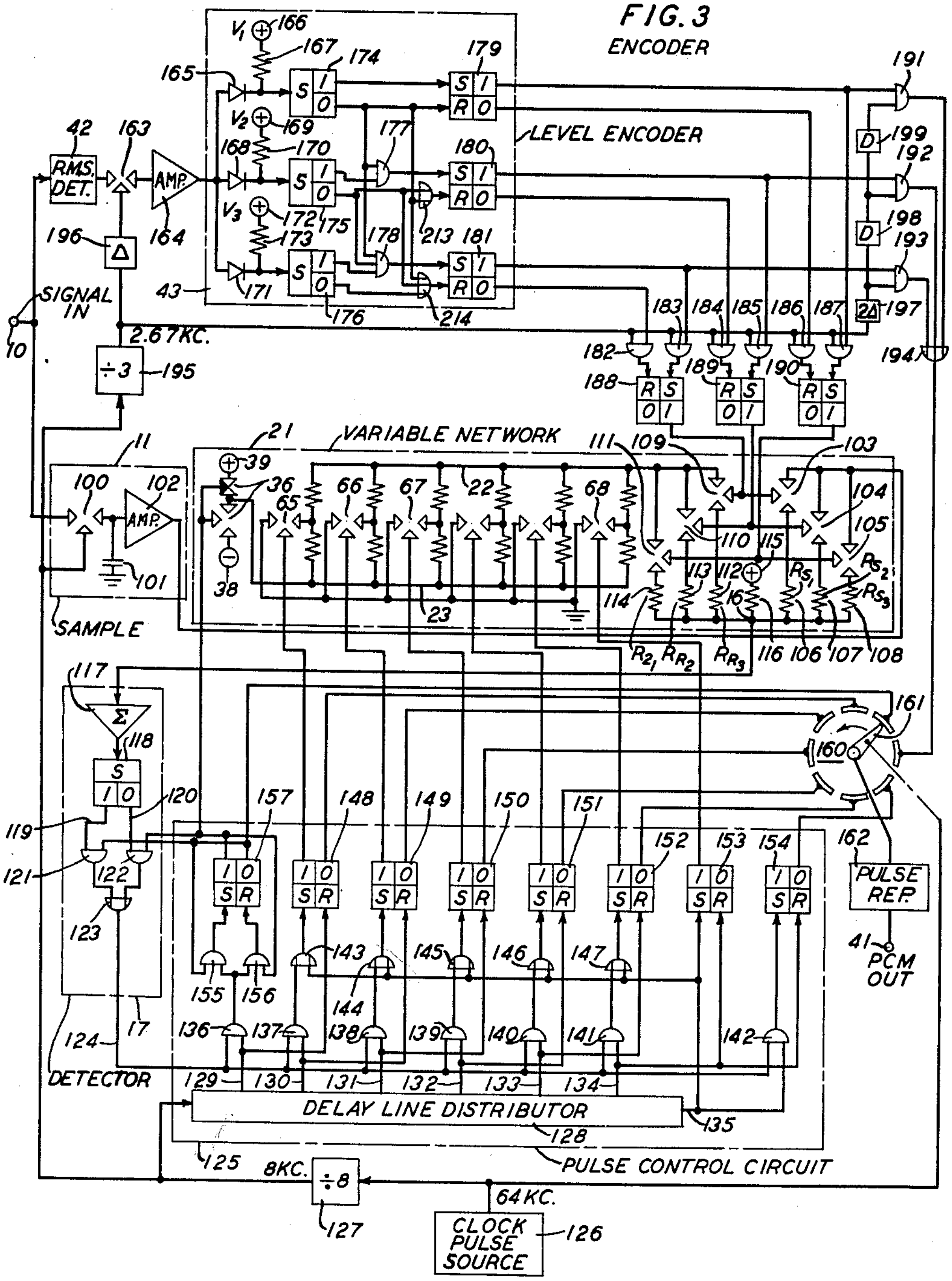
FIG. 3 is a more detailed diagram of the encoder shown in FIG. 1.
Figure 4:
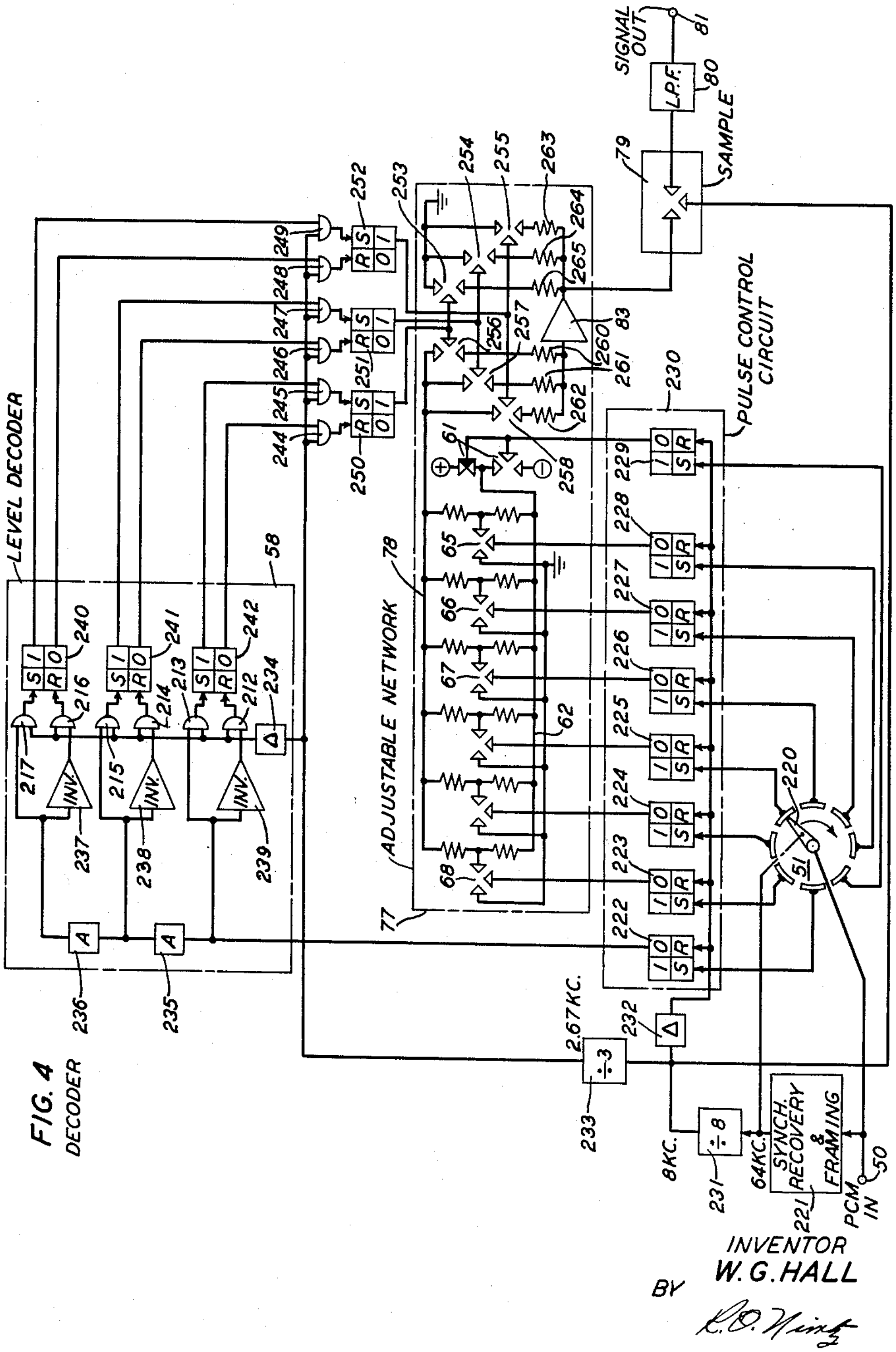
FIG. 4 is a more detailed diagram of the decoder shown in FIG. 2.

The encoder shown in FIG. 1 and the decoder shown in FIG. 2 have been greatly simplified to render the operation of these circuits as clear as possible. The operation of the various switches was assumed to occur at the appropriate times and no means were shown by which this operation was accomplished. FIGS. 3 and 4 show more detailed circuit diagrams of the encoder and decoder shown in simplified form in FIGS. 1 and 2, respectively.

Referring then to FIG. 3, there is shown a more detailed schematic diagram of a variable compression encoder in accordance with the present invention in which elements corresponding to the elements of FIG. 1 have been identified with the same reference numerals. Analog input signals applied to input terminal 10 are, therefore, simultaneously applied to a sampling circuit 11 and a root-mean-square detector 42. Sampling circuit 11 includes a normally opened sampling switch 100, a storage capacitor 101 and an isolating amplifier 102.

Switch 100 has been illustrated in FIG. 3 in accordance with a conventional schematic representation in which a normally opened switch is indicated by two arrows directed at each other but not touching. A third arrow, at right angles to the other two, schematically represents a switch closing element which is operated by a control signal applied to this arrow. In accordance with this same convention, a normally closed switch is represented by two arrows directed toward each other and touching. A solid arrow at right angles to the other two and also touching them represents a control element which opens the switch under the control of signals applied to the lead connected to this solid arrow. The switches thus represented schematically may actually comprise any electronic switches which operate at speeds appropriate to the system in which they are used. These switches may comprise, for example, simple diode switches, bilateral transistor switches, vacuum tube switches, or any other form well known in the art.

The output of sampling circuit 11 is applied to a bank of normally opened switches 103, 104 and 105 which in turn are connected to input resistors 106, 107 and 108, respectively. Switches 103 through 105, in conjunction with resistors 106 through 108, form a simple means of implementing the variable resistor element 13 in FIG. 1. That is, by selective operation of the switches 103 through 105, the value of the input resistor can be selectively varied. It is to be understood, however, that the selection of three values for this resistor is only for the purpose of clarity and should not be taken as limiting. It is clear that further resistors and associated switches could easily be provided to extend the variability of the input resistor to any extent desired.

The decoding network 21 in FIG. 3 is identical to that shown in FIG. 1 except for the schematic representation of the various switches and hence will not be further described here. Variable resistor 14 of FIG. 1 is implemented in FIG. 3 by means of three switches, 109, 110, and 111, and associated resistors 112, 113, and 114. There is also provided a biasing source 115 and a biasing resistor 116 to adjust the direct current level at the summing point 16.

The output of network 21 is applied to a threshold detector circuit 17 including a summing amplifier 117 and a double-output trigger circuit 118 which may, for example, comprise a Schmitt trigger. Circuit 118 provides two outputs on leads 119 and 120, each of which is the inverse of the other. For example, in its quiescent state, circuit 118 might provide a positive output signal on lead 120 and a zero output signal on lead 119. In response to an input from amplifier 117 which exceeds the zero level, the output on lead 119 assumes the positive value and the output on lead 120 assumes zero value. Signals on lead 119 comprise one input to logical AND gate 121 while signals on lead 120 provide one input to logical AND gate 122. The outputs of gates 121 and 122 are applied to logical OR gate 123, the output of which, appearing on bus 124, comprises the output of the detector circuit.

In order to control the operation of the various gates in network 21, there is provided a pulse control circuit 125 which generates the various pulses at the appropriate times. A clock pulse source 126, which may, for example, produce output pulses at a sixty-four kilocycle rate, provides the basic timing for the entire encoding circuit of FIG. 3. The output of source 126 is applied to a pulse dividing circuit 127 which divides the pulse train from source 126 by a factor of eight, thus producing on its output a pulse train having an eight kilocycle repetition rate. These pulses are simultaneously applied to switch 100 in sampling circuit 11 and to a delay line distributor 128 in pulse control circuit 125.

The entire delay of delay line distributor 128 is equal to the pulse period of the output from divider circuit 127, that is, 125 microseconds. Each pulse applied to the input of distributor 128 successively appears at tapping points 129 through 135 at regular intervals of 15.625 (125/8) microseconds. Each of leads 129 through 135 is applied to one input of AND gates 136 through 142, respectively. The outputs of AND gates 137 through 141 are applied to respective ones of OR gates 143 through 147 which, in turn, are connected at their outputs to the "set" input of a respective one of a plurality of bistable circuits 148 through 152. The output on lead 135 is applied directly to the set input of bistable circuit 153 and the output of AND gate 142 is applied directly to the set input of bistable circuit 154. The output of AND gate 136 is applied to one input of each of AND gates 155 and 156. The output of AND gate 155 is applied to the set input of a bistable circuit 157 and the output of AND gate 156 is applied to the reset input of the same bistable circuit 157. Output bus 124 from detector circuit 17 is connected to the remaining input of each of AND gates 136 through 142.

Bistable circuits 148 through 154 and 157 are schematic representations of any bistable multivibrator circuit which is capable of remaining in either one of two stable states and each of which produces two distinguishable outputs. One of these outputs appears on leads connected to that portion of the bistable circuit represented by the numeral "1" and appears in response to the application of a signal to the set input of the bistable circuit, represented by the letter "S." The other output appears on leads connected to that portion of the bistable circuit labeled "O" and appears in response to the application of the control signal to the reset input of the bistable circuit, represented by the letter "R." These bistable circuits have the property of remaining in either one of their two stable states until triggered to the other state by the application of an appropriate input signal. Such bistable circuits are well known in the art and will not be further discussed here.

Rather than utilizing the output of detector circuit 17 as the output of the encoder circuit of FIG. 3, this output is merely used to control the condition of the bistable circuits within pulse control circuit 125. These bistable circuits, in turn, control the operation of the switches within network 21. Since the condition of the bistable circuits within network 125 are the direct criteria of the states of the switches in network 21, the condition of these bistable circuits is utilized to generate the output code group. That is, the zero output leads from each of bistable circuits 157, 148, 149, 150, 151, 152 and 154 are connected to corresponding segments of a collecting commutator 160. Commutator 160 has a brush 161 which rotates in a counterclockwise direction to successively connect a pulse repeater 162 to the various segments. Brush 161 is controlled by an output pulse train from source 126 to step from segment to segment at a sixty-four kilocycle rate. Commutator 160 is illustrated as a mechanical commutator only for the purposes of illustration and would, in fact, comprise any one of the known electronic commutators.

The output of R.M.S. (root-means-square) detector 42 is applied through a normally opened switch 163 to an amplifier 164. The output of amplifier 164 is applied to level encoder 43 which includes a plurality of threshold detectors, each including a biased diode. Thus, diode 165 is reverse biased by source 166 through resistor 167; diode 168 is reverse biased by source 169 through resistor 170 and diode 171 is reverse biased by source 172 through resistor 173. The reverse biases applied to diodes 165, 168 and 171 are each different and are selected to distinguish between the root-mean-square input levels at which changes in compression characteristics are desired. If more than three distinct characteristics were utilized in the encoder of FIG. 3, there would, of course, be provided the required additional level detectors.

The output of diode 165 is applied to a trigger circuit 174 which may be substantially identical to trigger circuit 118 but which returns to its quiescent state only after a delay interval somewhat less than the period of the pulse train from divider circuit 195. Similarly, the output of diode 168 is applied to trigger 175 and the output of diode 171 is applied to the trigger circuit 176. It can be seen that the conditions of trigger circuits 174, 175 and 176 indicate which of diodes 165, 168 and 171 are conducting and hence give an indication of the magnitude of the root-mean-square input signal. AND gates 177 and 178 and OR gates 213 and 214 are utilized to translate the conditions of trigger circuits 174 through 176 into a one-out-of-three code which is stored in bistable circuits 179, 180 and 181.

The outputs of bistable circuits 179 through 181 are each applied to one input of a respective one of logical AND gates 182 through 187. The output of AND gate 182 is applied to the reset input of bistable circuit 188 and the output of AND gate 183 is applied to the set input of the same bistable circuit 188. The output of AND gate 184 is applied to the reset input of bistable circuit 189 and the output of AND gate 185 is applied to the set input of the same bistable circuit 189. The output of AND gate 186 is applied to the reset input of bistable circuit 190 and the output of AND gate 187 is applied to the reset input of the same bistable circuit 190. The "1" outputs of bistable circuits 179 through 181 are each also applied to a respective one input of AND gates 191, 192 and 193, the outputs of all of which are connected to inputs of OR gate 194. The output of OR gate 194 is applied to one segment of commutator 160.

The output of divider circuit 127 is applied to another divider circuit 195 which divides the eight kilocycle pulse train by a factor of three to produce on its output a pulse train having a 2.67 kilocycle repetition rate. The output of divider circuit 195 is applied to a delay circuit 196 having a delay less than the pulse period of clock source 126. The output of delay circuit 196 is used to operate gate 163. The output of divider circuit 195 is also applied to the remaining inputs of AND gates 182 through 187 and to a delay circuit 197 having a delay twice as large as that of delay circuit 196 but still less than the period of pulses from source 126. The output of delay circuit 197 is applied to the remaining input of AND gate 193 and to a delay circuit 198 having a delay equal to 125 microseconds. The output of delay network 198 is applied to the remaining input of AND gate 192 and to a delay circuit 199 also having a delay of 125 microseconds. The output of delay circuit 199 is applied to the remaining input of AND gate 191.

The "1" outputs of bistable circuits 188, 189 and 190 are applied to operate gates 103 through 105 and 109 through 111. Thus the "1" output of bistable circuit 188 operates gates 103 and 109; the "1" output of bistable circuit 189 operates gates 104 and 110; and the "1" output of bistable circuit 190 operates gates 105 and 111.

The operation of the circuit of FIG. 3 is as follows: Samples of the analog input signal at terminal 10 are derived by switch 100 at an eight kilocycle rate. These samples are applied by way of amplifier 102 and one of resistors 106 through 108 to summing point 16. The same timing signal which derives this sample is applied to distributor 128 and, after a one digit interval, appears on lead 129. Bistable circuits 148 through 154 are normally in their set or "1" state (by the application of a pulse from lead 135 through OR gates 143 through 147) and hence switches 65 through 68 are normally in their closed position. As described with respect to FIG. 1, this produces a zero reference signal on bus 22 which is applied through one of resistors 112 through 114 to summing point 16.

If the input signal is positive, the signal at point 16 will also be positive and the output of amplifier 117 will cause trigger circuit 118 to go to its "1" output state. This will produce an output by way of AND gate 121, OR gate 123 on bus 124 which, when combined with the output on lead 129 from distributor 128, fully enables gate 136 and hence partially enables gates 155 and 156. If bistable circuit 157 is already on the "1" state, AND gate 121 will not be fully enabled and no output will appear on bus 124 and bistable circuit 157 will remain in the "1"

state. If bistable circuit 157 is in the "0" state, AND gate 121 will be fully enabled, an output pulse will appear on bus 124 to enable gate 136, and AND gate 155 will be fully enabled to set bistable circuit 157 to the "1" state.

It can be seen that the circuit arrangement is such that bistable circuit 157 is operated to that condition which provides the desired polarity of reference potential on bus 23 in network 21. Had the input signal been negative, it can easily be seen that bistable circuit 157 would be reset to its zero state if not already there.

The output pulse on lead 129 is also applied to the reset input of bistable circuit 148 and thus resets this circuit and opens switch 65 in network 21. As explained with reference to FIG. 1, the opening of this switch modifies the reference signal applied to summing point 16 and a new comparison takes place.

If the input signal is less than this new reference signal, trigger circuit 118 will not go to its "1" state and an output is produced via gates 122 and 123 and bus 124 and applied to AND gate 137. After a one digit interval, the clock pulse appears on lead 130 to fully enable gate 137 and to set bistable circuit 148 by way of OR gate 143. A new comparison can now take place in network 21.

If the input signal is greater than the reference signal produced by opening switch 65, an output is produced by detector 17, gates 122, 123 and 137 are not fully enabled and bistable circuit 148 remains in the reset condition. In this same manner, bistable circuits 149 through 154 are successively reset, a new comparison made, and these bistable circuits either left in the "0" state or set back to the "1" state, depending on whether the input signal is less than or greater than the various reference potentials produced by the resulting permutation of switches 65 through 68.

Brush 161 is arranged to read out the states of bistable circuits 157 and 148 through 152 and 154 at some time after their state has been decided by the above-described procedure. The output clock pulse on lead 135 serves to set bistable circuit 153 to the "1" state and simultaneously sets all of bistable circuits 148 through 152 to the "1" state. At the same time bistable circuit 154 is either set to the "1" state by the output of AND gate 142 or remains in the reset state. Bistable circuit 154 is merely an additional storage stage for the least significant digit to allow this digit to be read out while the balance of the circuit begins the operation on the next succeeding sample.

Level encoding circuit 43 provides in digital form a representation of the root-mean-square level of the input signal integrated over at least syllabic intervals. This code is used by way of bistable circuits 188 through 190 to control the operation of switches 103 through 105 and 109 through 111, that is, input resistor $R_S$ and reference resistor $R_R$. Bistable circuits 188 through 190 are provided to insure that the encoding circuit of FIG. 3 continues to utilize a particular compression characteristic until such time as a remote decoding circuit can be directed to assume another compression characteristic.

Gates 191 through 193 serve to read out the condition of bistable circuits 179 through 181, respectively, and apply these conditions to collector commutator 160. Brush 161 of commutator 160 contacts the appropriate segment of the commutator once each revolution and in so doing picks up one digit of a three digit code representing the root-mean-square input level. Divider circuit 195 insures that samples of the output of detector 42 are obtained only once for every three signal samples taken by sampling circuit 11. The same output pulses from divider circuit 195 operate gates 182 through 187 to transfer a level code to bistable circuits 188 through 190 just before a new code is entered into bistable circuits 179 through 181. Meanwhile, the new code now stored in bistable circuits 179 through 181 can be read out by this same pulse after successive delays in delay circuits 197 through 199. The new level code is therefore transmitted to the remote decoding circuit before it is utilized by bistable circuits 188 through 190 to control the values of resistors $R_S$ and $R_R$ in the encoder circuit of FIG. 3.

It can be seen that the circuit shown in FIG. 3 is arranged to perform all the operations necessary for the encoding of signals in accordance with the procedure represented schematically in FIG. 1. The curvature as well as the terminal points of the compression characteristic provided by the encoder of FIG. 3 respond directly to the root-mean-square level of the input signal.

Figure 5:
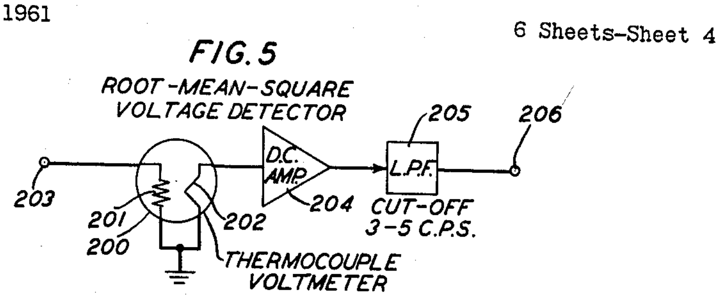
FIG. 5 is an illustrative example of a root-mean-square signal detector suitable for use in the encoder of FIG. 3.

One form of root-mean-square detector suitable for use in the encoder of FIG. 3 is illustrated in FIG. 5. The detector of FIG. 5 comprises a voltmeter 200 including a heating element 201 and a temperature sensitive element 202. The signal developed by element 202 is directly proportional to the power dissipated in element 201 and hence to the root-mean-square value of the input signal applied to terminal 203.

The output of element 202 is connected to a direct current amplifier 204 which, in turn, is connected to a low pass filter 205. The upper cutoff frequency of filter 205 is substantially equal to the expected maximum frequency of more or less regular variations in the amplitude of the input signal. In the case of speech, for example, the upper cutoff frequency of filter 205 is equal to the syllabic frequency of speech which is on the order of three to five cycles per second. The output at terminal 206 is therefore a measure of the root-mean-square input signal integrated over at least syllabic intervals.

It is to be understood, of course, that the arrangement of FIG. 5 is merely illustrative of one form of root-mean-square detector and that many other circuits suitable for performing this function are readily available to those skilled in the art.

Figure 6:
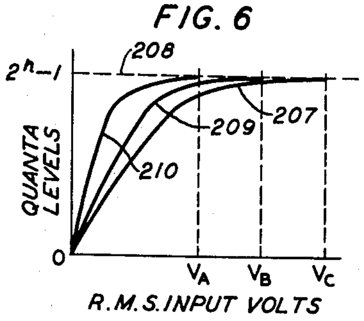
FIG. 6 is a graphical representation of typical compression characteristics realizable with the encoder of FIG. 3.

In FIG. 6 there is shown a graphical representation of the compression characteristics of the encoder of FIG. 3. Curve 207, for example, is a plot of the analog values of the quanta levels represented by the output codes provided by the encoder of FIG. 3 versus the root-mean-square value of the actual input signal. Curve 207 is a section of a hyperbola intersecting the origin and intersecting quantum level 208, the maximum qauntum level recognized by the system, at an input signal level represented by the voltage $V_C$.

Also shown in FIG. 6 are two other curves, 209 and 210, having different curvatures and different intersections with level 208 than curve 207, but also intersecting the origin. Curves 207, 209 and 210 correspond, respectively, with the compression curves available in the encoder of FIG. 3 with the selective operation of pairs of switches including switches 103 to 105 and 109 to 111.

It can be seen that input signals having a large root-mean-square value are provided with a compression characteristic 207 having less curvature and providing code representations for large input signal values. Curves 209 and 210 provide compression characteristics for progressively less loud input signals having more curvature and lower intercepts with level 208. Curve 209, for example, might be used with signal sources having a root-mean-square input value corresponding to the middle range of R.M.S. input values of all signals expected to be applied to the encoder of FIG. 3. Curve 207 might then correspond to the loudest input signals expected to be applied to the encoder of FIG. 3 and curve 210 might correspond to the root-mean-square value of the weakest signal expected to be applied to the encoder of FIG. 3. In each case, the particular compression curve utilized provides the optimum signal-to-quantizing noise ratio possible with that particular level of input signal.

Referring now to FIG. 4, there is shown a detailed schematic diagram of a decoding circuit suitable for use in connection with the encoding circuit of FIG. 3 and corresponding to the more general schematic diagram of FIG. 2. Thus pulse-modulated-code groups applied to input terminal 50 are, in turn, applied to distributor 51 illustrated in the form of a mechanical distributing commutator having a brush 220 which rotates in a clockwise direction to successively contact eight commutator segments. A synchronization recovery and framing circuit 221 derives timing and framing information from the pulse sequence applied to terminal 50 and utilizes this information to insure that brush 220 delivers successive input pulses to successive segments of commutator 51. Framing could be accomplished by looking at every eighth time slot and noting which set of these provide a one-out-of-three code. This, of course, would determine the frame for each level code and by count up procedures, the word frame interval The level code framing can be obtained by similar methods using well-known framing techniques. The output from synchronization recovery and framing circuit 221 includes a clock pulse train having a repetition rate of 64 kilocycles corresponding to the output pulse rate from the encoder circuit of FIG. 3.

Each segment of commutator 51 is connected to the "set" input of a corresponding one of eight bistable circuits 222 through 229 in pulse control circuit 230. After one complete revolution of brush 220, a pulse group arriving at terminal 50 is registered in the bistable circuits of pulse control circuit 230. The bistable circuit 222 controls the operation of a level decoding circuit 58 while bistable circuits 223 through 229 control the position of switches 61 and 65 through 68 in network 77. Network 77 is substantially identical to network 21 in FIG. 3 and hence provides on bus 78 an analog signal substantially equal to the analog signal produced by the passive resistance network 21 in FIG. 3.

Level decoder circuit 58 receives one digit of a three digit level code for each complete revolution of brush 220. The output of circuit 221 is applied to a divider circuit 231 which divides the sixty-four kilocycle pulse train applied to its input by a factor of eight and, after a delay in circuit 232 less than a full digit delay, is utilized to reset bistable circuits 222 through 229 to their "0" state. This eight kilocycle pulse train is also applied to a further pulse dividing circuit 233 which divides this pulse train by a factor of three and applies the resulting pulse train to a delay circuit 234 providing a delay of less than a pulse interval.

The output of bistable circuit 222 is applied to a delay network 235 having delay equal to eight pulse intervals of the pulse train applied to terminal 50. The output of delay circuit 235 is applied to an identical delay circuit 236 having a same delay interval. After three complete revolutions of commutator 51, the three digits of a level code are simultaneously available at AND gates 212 through 217. The output of delay network 234 gates the level code into bistable circuits 240, 241 and 242. The pulses representing this level code are applied directly to the set inputs of the appropriate combination of bistable circuits 240 to 242 while the no pulse conditions are inverted by inverting circuits 237 through 239 to apply a pulse to the reset input of the appropriate ones of bistable circuits 240 to 242.

In this way a new level code is registered at the decoder of FIG. 4 once for every three amplitude sample codes registered in bistable circuits 223 through 229. The outputs for bistable circuits 240 through 242 are applied by way of AND gates 244 through 249 to the appropriate inputs of bistable circuits 250 through 252. The outputs of bistable circuits 250 through 252 are in turn utilized to close respective ones of switches 253 through 255 and 256 through 258. Switches 256 through 258 in turn interpose between the passive resistive network connected to bus 78 and the input of impedance converting amplifier 83, one of the three resistors 260, 261 or 262. These resistors, of course, correspond to the resistors 112 through 114 in the encoding network of FIG. 3 and hence provide at the input to amplifier 83 an analog signal level corresponding to the level of the input signal applied to point 16 in FIG. 3. The output of amplifier 83 is applied to one end of resistors 263 through 265, the other end of one of which is connected to ground potential by way of one of switches 253 through 255, and to a sampling circuit 79 operated by pulses from divider circuit 231 to derive a series of pulse-amplitude-modulated samples having an envelope following the value of the analog signal. This pulse-amplitude-modulated sample sequence is applied to low pass filter 80 which removes all frequencies equal to or above the sampling rate and provides at output terminal 81 an output signal varying in substantially the same manner as the input signal applied to terminal 10 in the encoder of FIG. 3.

It can be seen that the decoder circuit of FIG. 4, when used in conjunction with the encoder circuit of FIG. 3, provides a transmission system having substantially no signal degradation due to transmission line noise, since transmission is on a pulse basis, and having a minimum of signal-to-quantizing noise degradation due to the variable companding characteristic provided by the circuits of the present invention. This system is particularly useful for the transmission of signals having a wide diversity in the root-mean-square level of the input signal. Voice transmission systems, for example, having an input signal range of at least 50 decibels would encounter particular advantages in systems of the present type.

It will be further noted that if the input signal level is insufficient to energize the lowest threshold detector of level encoder 43 in FIG. 3, the encoder circuit will be completely disabled since none of switches 103 through 105 and 109 through 111 will be closed. This lower threshold level will, of course, be adjusted to discriminate between the average noise level expected at input terminal 10 and the level of the weakest input signal applied to terminal 10. Since these noise levels, when appearing by themselves, are not transmitted through the system, the contrast of even very weak signals tends to increase the intelligibility of these weak signals.

Figure 7:
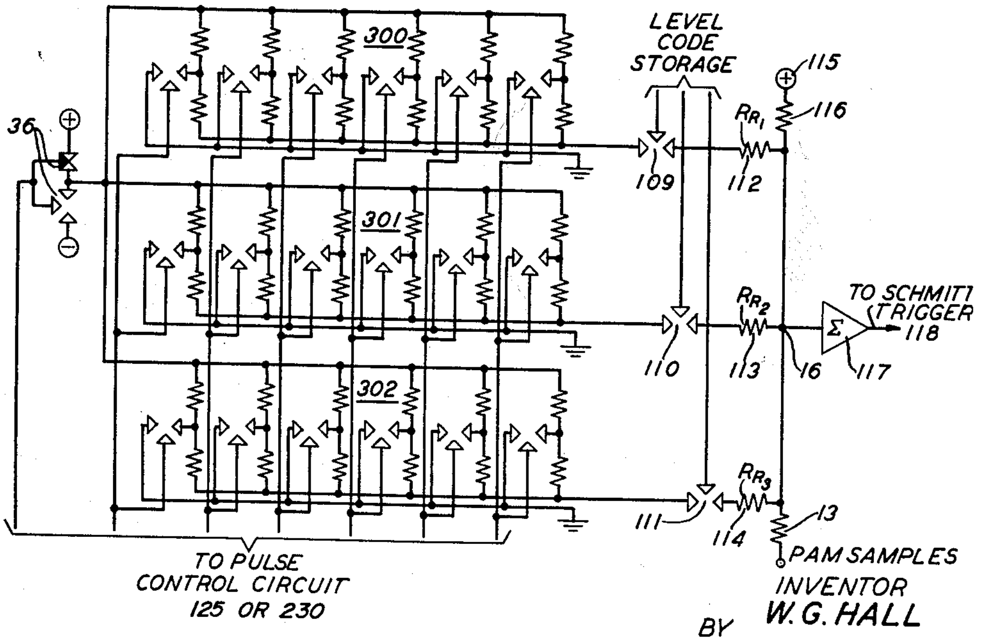
FIG. 7 is a schematic diagram of an alternative selectable characteristic nonlinear network suitable for use in the circuits of FIGS. 3 and 4.

In FIG. 7 there is shown an alternative variable compression network suitable for use in networks 21 and 77 in FIGS. 3 and 4. Rather than varying the value of input resistor 13, separate decoder networks 300, 301, and 302 are provided, one for each compression characteristic. Each of networks 300 through 302 has supplied thereto a reference voltage from switch 36 in the same manner as described with reference to FIG. 3. The values of the various resistors in these networks, however, are proportional so as to provide the desired compression characteristics. That is, the value of $m$ is different in each of these networks as well as the values of R and $R_R$. As in FIG. 3, switches 109 through 111 serve to connect each of these networks through respective ones of resistors 112 through 114 to point 16. The network of FIG. 7 can therefore be substituted in FIG. 3 as network 21 and produces the same over-all operation of the encoding circuit. A similar network would, of course, have to be substituted for network 77 in FIG. 4 to provide a complete system.

The transmission system illustrated by the encoding and decoding circuits of FIGS. 3 and 4 illustrates the application of the present invention to a system including a single signal source and a single utilization means. The system of the present invention, however, can even more advantageously be applied to a system having a large plurality of signal sources and a corresponding plurality of utilization means. The transmitter and receiver for such a multiplex system is illustrated in schematic form in FIGS. 8 and 9.

Figure 8:
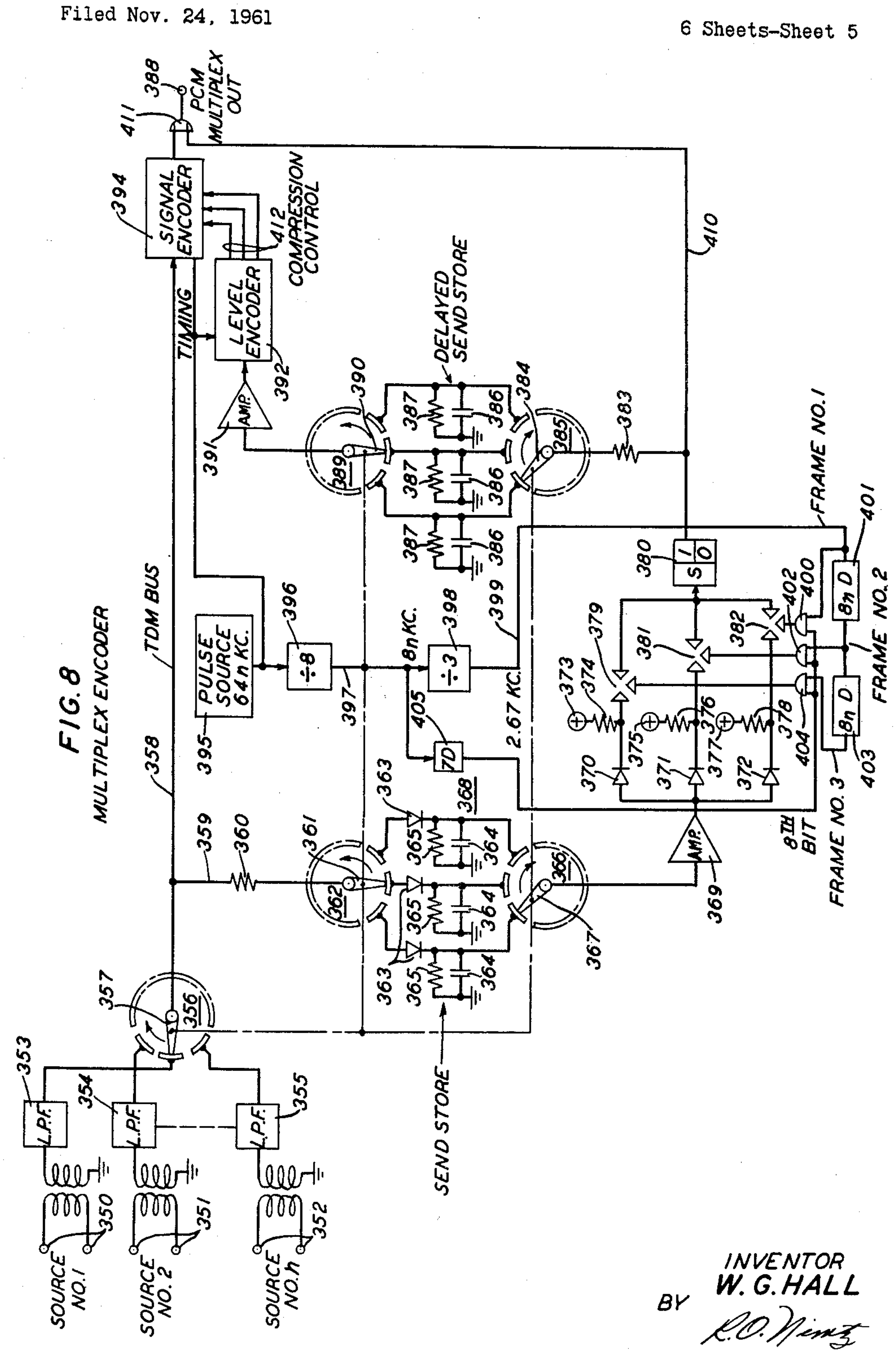
FIG. 8 is a schematic diagram of a time division multiplex transmitter employing the variable companding encoder of the present invention.

Referring more particularly to FIG. 8, there is shown a simplified schematic diagram of a pulse-code-modulation multiplex transmitting terminal incorporating a variably companding encoder in accordance with the present invention. The multiplex encoding circuit of FIG. 8 comprises a plurality of input terminals 350, 351, and 352, each connected through an isolating transformer to a corresponding low pass filter circuit 353, 354, and 355. Filter circuits 353 through 355 are arranged to limit the baseband frequency of sources 350 through 352 to a level suitable for transmission in the balance of the transmission system.

The outputs of each of filter circuits 353 through 355 are connected to a respective segment of sampling commutator 356. Commutator 356 includes a brush 357 arranged to connect time division multiplex bus 358 successively to the various segments of commutator 356.

Lead 359 is connected to bus 358 and, by way of resistor 360, to brush 361 of commutator 362. Commutator 362 has a plurality of segments equal in number to the segments of commutator 356. Connected to each segment of commutator 362 is a detector circuit including a diode 363, a capacitor 364 and a resistor 365. Diodes 363 are arranged to deliver positive charges to one plate of capacitors 364. Resistors 365 are connected in shunt with capacitors 364 so as to provide a discharge path for these capacitors. The time constant of resistors 365 and capacitors 364 is chosen to be significantly greater than the period of revolution of brush 361 of commutator 362. Together, diodes 363, capacitors 364 and resistors 365 comprise a "Send Storage" circuit 368.

It will be noted that the circuit of FIG. 8 utilizes average signal detectors in the form of capacitors 364 and resistors 365 to ascertain the level of the input signal. In FIGS. 1 and 3, of course, a root-mean-square detector is utilized for this purpose. It has been found, however, that negligibly small errors occur when average signal level detectors are utilized instead. Moreover, this arrangement permits vastly simplified circuitry. Instead of the elements shown in FIG. 5, only a simple diode, resistor and capacitor circuit is required in the circuit of FIG. 8.

A collecting commutator 366 is provided having a plurality of segments equal in number to the segments of commutators 362 and 356 and having a brush 367 arranged to successively contact these segments at a time just subsequent to the time at which brush 361 contacts the associated segment of commutator 362.

It can be seen that commutator 362 serves to deliver a charge to each average signal detector of send store circuit 368 which is proportional to the level of the amplitude-modulated pulse derived by commutator 366. At a short time thereafter, commutator 366 operates to derive a sample of the output of the associated average level detector.

The output samples derived by commutator 366 are applied to an amplifier 369 which, in turn, applies its output to a bank of threshold detecting diode circuits including diodes 370, 371 and 372. Diode 370 is reverse-biased from voltage source 373 by way of resistor 374. Diode 371 is, in turn, reverse-biased by source 375 by way of resistor 376, and diode 372 is reverse-biased by source 377 by way of resistor 378. Diodes 370 through 372 provide an analogous function to diodes 165, 168 and 171 in FIG. 3. That is, these diodes serve to encode the level presented to their respective inputs by reason of the relative values of their threshold biases. Diode 370 is connected by way of switch 379 to trigger circuit 380, while diode 371 is connected to the input of trigger circuit 380 by way of switch 381, and diode 372 is connected to input of the same trigger circuit 380 by way of switch 382.

It can be seen that diode 370 will serve to apply an input to trigger circuit 380 when the output of amplifier 369 exceeds the threshold level presented by voltage source 373. Similarly, diode 371 will provide an input to trigger circuit 380 when the output of amplifier 369 exceeds the value of voltage source 375 and diode 372 will produce an output when the output of amplifier 369 exceeds the value of voltage source 377.

The output of trigger circuit 380 is applied by way of resistor 383 and brush 384 of commutator 385 to a plurality of delayed signal storage circuits including capacitors 386 and resistors 387. The output of trigger circuit 380 is also applied through OR gate 411 to output terminal 388.

The output of delayed storage circuits 386 and 387 are applied by way of brush 390 of commutator 389 to the input of amplifier 391. The output of amplifier 391 is, in turn, applied to a level encoding circuit 392, which may be similar to level encoder 43 in FIG. 3. As in FIG. 3, the output of level encoder 392 comprises three leads 412 which are in turn applied to a signal encoding circuit 394 which may be substantially identical to the balance of the encoding circuit shown in FIG. 3. Bus 358 is also applied to encoding circuit 394 and provides, in successive time slots, amplitude-modulated pulse samples of the signals applied from sources 350 through 352 to collecting commutator 356. The output of encoding circuit 394 is connected to output terminal 388 through OR gate 411.

A clock pulse source 395 is provided to provide the basic timing information for all of the circuits of FIG. 8. The output of clock pulse source 395 is applied directly to encoding circuits 392 and 394 to provide the timing necessary for these encoding functions. The output of source 395 is also applied to a pulse dividing circuit 396 which divides this pulse train by a factor of eight. Again, assuming that the signals applied to terminals 350 to 352 are speech signals which require a sampling rate of eight kilocycles, the repetition rate of source 395 would then be $64n$ kilocycles where $n$ is the number of signal sources connected to the segments of commutator 356.

The output of divider circuit 396 would then comprise a pulse train having a repetition rate of $8n$ kilocycles per second. This output is utilized to drive commutators 356, 362, 366, 385 and 389, remembering that commutator 366 is arranged to lag behind commutator 362 by at least one pulse period whereas commutator 385 is likewise arranged to trail commutator 389 by an equal amount.

Lead 397 is connected to a further pulse dividing circuit 398 which serves to divide the pulse train appearing on lead 397 by a factor of three. The output of divider circuit 398, appearing on lead 399, therefore carries a train of pulses having a repetition rate which is one third less than the revolution rate of commutators 356, 362, 366, 385 and 389. This train of pulses is applied directly to an AND gate 400 and a delay network 401 having a delay equal to $8n$ times the bit period of the output codes provided by encoder 394. The output of delay network 401 is applied simultaneously to AND gate 402 and delay network 403 also having a delay substantially equal to the delay of network 401. The output of delay network 403 is applied to one input of AND gate 404. The output of dividing circuit 396 appearing on lead 397 is also applied to a delay network 405 having a delay equal to seven times the digit interval provided by encoding circuit 394. The output of delay network 405 is applied to the remaining inputs of AND gates 400, 402 and 404. The output of AND gates 400, 402 and 404 are applied, respectively, to enable gates 382, 381 and 379.

It is readily apparent that the multiplex encoding circuit of FIG. 8 operates in the following manner: Pulse-amplitude-modulated samples derived by commutator 356 are applied by way of bus 358 to signal encoding circuit 394 where, as in FIG. 3, these samples are encoded into binary permutation code groups having a nonlinear relationship to the amplitude of the corresponding pulse samples. These samples are also delivered by way of commutator 362 to corresponding send storage circuits 368 including a capacitor 364 and a resistor 365. In circuits 368, a signal is stored proportional to the average amplitude of the successive samples from each source as derived by commutator 356. That is, capacitors 364 and resistors 365 are arranged to have a time constant such that the amplitude levels of successive samples delivered to these resistance-capacitance networks are integrated over at least syllabic intervals. The voltage on capacitors 364 can therefore be said to be related directly to the average amplitude of the corresponding signal sources applied to commutator 356.

Commutator 366 and amplifier 369 serve to derive samples from the signals stored on the capacitors 364 and deliver them to the level encoding network including diodes 370 through 372. The signals on lead 399, together with delay circuits 401 and 403 and AND gates 400, 402 and 404, serve to sample the output of diodes 370 through 372 on successive frames and to deliver these samples to trigger circuit 380. Furthermore, the signal derived by way of delay network 405 serves to insure that these samples are taken only in the eighth pulse period of the time slot reserved for the encoding of each sample derived by the commutator 356. Commutator 385 delivers, by way of resistor 383, a standardized charge to capacitors 386 whenever any one of diodes 370 through 372 conducts and the associated one of switches 379, 381 and 382 is enabled. This same output of trigger circuit 380 is also delivered by way of lead 410 to output terminal 388 as a pulse in the eighth pulse position of a corresponding pulse code group.

It can be seen that the signals delivered by way of commutator 385 to capacitors 386 and by way of lead 410 to terminal 388 comprise pulse code groups indicative of the amplitude of the signals stored on capacitors 364. That is, for a first level of signal on capacitors 364, none of diodes 370 through 372 will conduct and no output will be produced by trigger circuit 380. For a second, somewhat higher, level on capacitors 364, only one of diodes 370 through 372 will conduct and trigger circuit 380 will produce an output once for every three frames of signal samples derived by commutator 356. For a third, still higher, range of levels on capacitor 364, two of diodes 370 through 372 will conduct and trigger circuit 380 will deliver two pulses to terminal 288 for every three frames. In a fourth signal level range registered on capacitor 364, all of diodes 370 through 372 will conduct and trigger circuit 380 will deliver three pulses for every three frames. The levels represented by the charges on capacitor 364 are therefore encoded by means of this zero, one, two, or three-out-of-three code, each digit of which is attached to the signal code for the corresponding signal source. It will, however, require three successive signal codes to transmit a single level code encoded in this manner.

Since level encoding circuit 392 is controlled directly by the signal levels appearing in capacitors 386, the level utilized to control the compression characteristic of encoding circuit 394 will lag somewhat behind the actual signal levels recorded by capacitors 364. This lag, however, will be exactly equal to the lag which the remote decoding circuit is subjected to, due to the requirements for changing the level code at that remote receiver.

It can be seen that the level codes registered in capacitors 386 and transmitted by way of terminal 388 are not instantaneously proportional to the levels registered in capacitors 364. Instead a change in level on capacitors 364 requires a period of several frames before similar levels are recorded on capacitors 386. This delay insures that changes in the compression characteristic utilized by encoding circuit 394 cannot occur before corresponding changes in the expansion characteristic of a remote multiplex decoder also occur.

Figure 9:
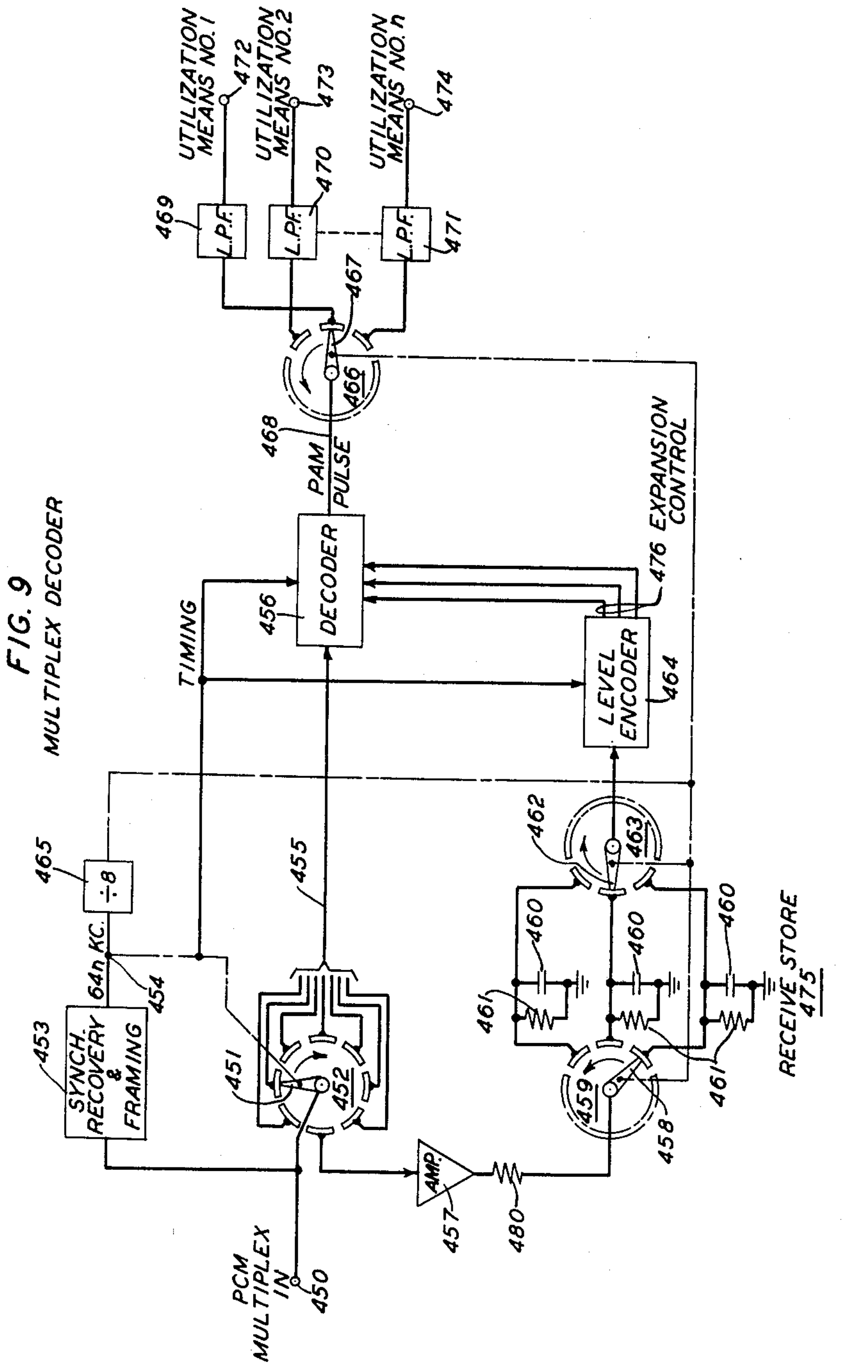
FIG. 9 is a schematic diagram of a time division multiplex receiver suitable for use with the transmitter of FIG. 8.

Referring then to FIG. 9, there is shown a simplified schematic diagram of a multiplex decoding circuit employing a variable expansion characteristic in accordance with the present invention. The decoding circuit of FIG. 9 comprises input terminal 450 which is connected by way of any known transmission facility to output terminal 388 in FIG. 8. Terminal 450 is connected directly to brush 451 of distributing commutator 452. Terminal 450 is also connected to a synchronization recovery and framing circuit 453 which serves to derive on output lead 454 a clock pulse train having a repetition rate equal to the average repetition rate of the pulse train applied to terminal 450. This pulse train on lead 454 is utilized to drive brush 451 on commutator 452.

Commutator 452 has eight segments corresponding to the eight digits of each pulse code group delivered to terminal 450. Thus, distributor 452 serves as a series-to-parallel converter to convert the serial pulse train appearing at terminal 450 to parallel pulse code groups, seven digits of which appear on cable 455. Cable 455 is connected to the input of decoding network 456 which may be similar in most respects to the decoding network of FIG. 4.

One segment of commutator 452 is connected to the input of an amplifier circuit 457, the output of which is applied through a resistor 480 to brush 458 of commutator 459. Each segment of commutator 459 is connected to a receive storage circuit including a capacitor 460 and a parallel resistor 461.

As will be recalled, the eighth pulse position in every pulse code group carries one digit of a three digit level code in accordance with the encoding scheme detailed with reference to FIG. 8. Each digit of these level codes is delivered by way of commutator 459 to a corresponding one of capacitors 460.

Brush 462 of commutator 463 samples the charges stored on capacitors 460 and delivers them in succession to a level encoding circuit 464 which is similar to level encoding circuit 58 in FIG. 4. A three digit level code is provided on leads 476 by encoder 464 to control the expansion characteristic of decoding network 456. The output of decoding network 456 comprises a series of pulse-amplitude modulated pulses appearing on lead 468. These pulses are delivered by way of brush 467 of distributing commutator 466 to filter circuits 469, 470 and 471. The outputs of filter circuits 469 through 471, appearing on terminals 472, 473 and 474, comprise the outputs of the decoding circuit and correspond, respectively, to the inputs supplied to terminals 350 through 352 in FIG. 8.

The output of timing recovery circuit 453 is delivered by way of lead 454 to dividing circuit 465 which divides the pulse train on lead 454 by a factor of eight and delivers this output pulse train to control the operation of commutators 459, 463 and 466.

It can be seen that the encoding and decoding networks of FIGS. 8 and 9 serve to provide variable compression and expanding circuits for a plurality of signals and, furthermore, serve to multiplex these signals in the form of pulse-code-modulated code groups between output terminal 388 in FIG. 8 and input terminals 450 in FIG. 9. The arrangement of FIGS. 8 and 9 has the further advantage of representing the various levels of the input signals in a simple binary code. This code provides a number of digits in each three digit interval directly proportional to the average signal level for each signal input. Rather than representing absolute magnitudes of these signal levels the digits of the signal level codes represent the amount and the direction of the change required in already stored signal levels. In a sense, therefore, these level codes are differential codes which indicate the amount of change required in the already stored level codes. This differential encoding is arranged to provide a shift through the entire range of possible level codes in a minimum time of five to six samples of each signal source. In this way a degree of integration of the input levels is possible without the use of any integrating or averaging circuitry.

It is to be understood that the above described arrangements are merely illustrative of numerous and varied other arrangements which may constitute applications of the principles of the present invention. Such other arrangements may readily be devised by those skilled in the art without departing from the spirit and the scope of the invention.

What is claimed is:

1. A transmission system comprising, in combination, a source of signals, means for deriving regularly spaced samples of signals from said source, encoding means for encoding each of said samples in pulse permutation code groups, said encoding means including means for instantaneously compressing the amplitude range of signal increments represented by discrete ones of said code groups, means responsive to the root-mean-square level of said signals for deriving control signals, and means responsive to said control signals for varying the limits and curvature of the compression of said amplitude range by said compressing means.

2. The transmission system according to claim 1 wherein said encoding means includes a passive resistive network to generate a variable reference voltage for comparison with each of said signal samples, and said compressing means includes means for varying at least one otherwise unvarying element in said passive network.

3. The transmission system according to claim 1 including means for encoding said control signals in pulse permutation code groups, and means for interleaving said control signal code groups with said signal sample code groups.

4. A variable compression encoder comprising a source of intelligence-bearing signals having a mean amplitude level which varies throughout a range of values, means for encoding signals from said source in permutation code groups bearing a nonlinear relationship to the encoded amplitude intervals, means for detecting said mean amplitude level, and means for varying the curvature of said nonlinear relationship in response to said mean amplitude level.

5. In a pulse-code modulation transmission system, a source of communication signals, means for storing the syllabic-average amplitude of said communication signals, means for quantizing said syllabic-average amplitude, pulse-code modulation encoding means for effecting a translation from amplitude samples of said communication signal into permutation code groups of pulses, a plurality of nonlinear feedback networks each adapted to be connected in feedback relationship with said encoding means to effect a nonlinear amplitude compression of said communication signal sample, said plurality of feedback networks having different preselected compression characteristics, compression control switching means for selectively connecting one of said nonlinear feedback networks in feedback relationship with said encoding means, and means for delivering said quantized average amplitude to said compression control switching means to effect a selective connection of a predetermined one of said nonlinear feedback networks in accordance with the quantization level of said quantized average amplitude.

6. In combination, a signal source having a variable mean amplitude level, feedback encoding means for encoding signals from said source, said feedback encoding means including nonlinear feedback circuit means for providing codes representative of particular signals which codes bear a nonlinear relationship to the signals represented, and means responsive to said mean amplitude level for varying the curvature of said nonlinear relationship.

7. The combination according to claim 6 wherein said nonlinear circuit means comprises a plurality of series resistance circuits each comprising a pair of resistances connected in series, each of said series circuits connected in parallel with all other of said series circuits, a source of a first reference potential connected to one end of all of said resistive circuits, switching means for connecting the midpoint of each of said series resistance circuits to a second reference potential, and a reference impedance connected to the other end of all of said resistive circuits.

8. The combination according to claim 7 including means for varying said reference impedance in response to said mean amplitude level.

9. The combination according to claim 7 including means for varying the ratio between the values of each of said pairs of resistors in response to said mean amplitude level.

10. The combination according to claim 6 further including transmitting means for transmitting representations of said mean amplitude levels and said signal codes, a transmission medium connecting to said transmitting means, and receiving means connected to said transmission medium, said receiving means including nonlinear decoding means for deriving signals from said signal codes and said mean amplitude level representations substantially identical to the corresponding signals applied to said encoding means.

11. A transmission system comprising, in combination, a plurality of signal sources, means for recurrently deriving signal samples from said sources in regular rotation, encoding means for encoding each of said samples in pulse permutation code groups, said encoding means including means for compressing the amplitude range of signal increments represented by discrete ones of said code groups, means for detecting and storing the average amplitude of each of said signal sources, and means responsive to each of said stored average amplitudes for varying the relative compression of said amplitude ranges by said compressing means for the corresponding signal source.

12. The transmission system according to claim 11 further including means for encoding each of said average amplitude levels in a pulse frequency code, and means for interleaving said pulse permutation code groups and said pulse frequency codes according to a preselected pattern.

References Cited by the Examiner

UNITED STATES PATENTS

| | | | |
|---|---|---|---|
| 2,586,825 | 2/52 | Jacobsen | 179—15 |
| 2,889,409 | 6/59 | Carbrey | 325—38 |

DAVID G. REDINBAUGH, *Primary Examiner.*